Figure 5:
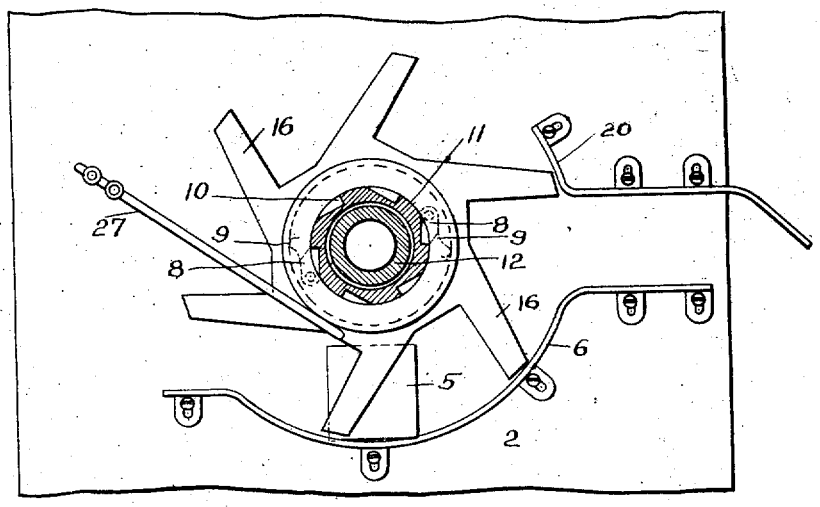

L. H. BRINKMAN.

BOTTLE CAPPING MACHINE.

APPLICATION FILED AUG. 29, 1914.

Reissued Dec. 22, 1914.

13,851.

6 SHEETS—SHEET 1.

WITNESSES

Samuel H. Ward Jr.

John O. Sempler

INVENTOR,

Louis H. Brinkman

BY

Kenyon & Kenyon his ATTORNEYS

L. H. BRINKMAN.

BOTTLE CAPPING MACHINE.

APPLICATION FILED AUG. 29, 1914.

Reissued Dec. 22, 1914.

13,851.

5 SHEETS—SHEET 2.

WITNESSES

Samuel H. Ward Jr.

John O. Sempler

INVENTOR

Louis H. Brinkman,

BY

Kenyon & Kenyon his ATTORNEYS

L. H. BRINKMAN.

BOTTLE CAPPING MACHINE.

APPLICATION FILED AUG. 29, 1914.

Reissued Dec. 22, 1914.

13,851.

5 SHEETS—SHEET 3.

WITNESSES

Samuel M. Ward Jr.

John O. Gempler

INVENTOR

Louis H. Brinkman

BY

Kenyon & Kenyon his ATTORNEYS

L. H. BRINKMAN.

BOTTLE CAPPING MACHINE.

APPLICATION FILED AUG. 29, 1914.

Reissued Dec. 22, 1914.

13,851.

5 SHEETS—SHEET 4.

WITNESSES

Samuel H. Ward Jr.

John O. Gempler

INVENTOR

Louis H. Brinkman

BY

Kenyon & Kenyon his ATTORNEYS

L. H. BRINKMAN.

BOTTLE CAPPING MACHINE.

APPLICATION FILED AUG. 29, 1914.

Reissued Dec. 22, 1914.

13,851.

5 SHEETS—SHEET 5.

WITNESSES

Samuel M. Ward Jr.

John O. Gempler.

INVENTOR,

Louis H. Brinkman

BY

Kenyon & Kenyon his ATTORNEYS.

UNITED STATES PATENT OFFICE.

LOUIS H. BRINKMAN, OF GLEN RIDGE, NEW JERSEY, ASSIGNOR TO GENERAL INDUSTRIES COMPANY, A CORPORATION OF NEW YORK.

BOTTLE-CAPPING MACHINE.

13,851. Specification of Reissued Letters Patent. Reissued Dec. 22, 1914.

Original No. 1,094,776, dated April 28, 1914, Serial No. 662,876. Application for reissue filed August 29, 1914. Serial No. 859,245.

*To all whom it may concern:*

Be it known that I, LOUIS H. BRINKMAN, a citizen of the United States, residing at Glen Ridge, in the county of Essex and State of New Jersey, have invented a new and useful Bottle-Capping Machine, of which the following is a specification.

My invention relates more particularly to bottle capping machines or the like, and especially to those adapted to put what is termed a metallic cap and seal upon a bottle.

One object of my invention is to provide a machine of this class which will automatically adjust itself to bottles of various heights, so that the insertion of a bottle of greater height will not be liable to be followed by breakage of the bottle or injury to the machine.

A further object is to provide a machine in which the capping dies will automatically adjust themselves to bottles with necks or mouths of various sizes and diameters and having other irregularities.

A further object is to provide a machine with a hopper and a chute leading from the hopper, and having one end secured to the die head whereby delivery of the caps or seals is made more efficient.

A further object is to provide a machine which is entirely automatic in all its operations, especially with regard to the reversals of the capping pistons at both ends of their line of movement.

A further object is to provide a machine which may be operated at high speed without danger of doing injury either to the bottles or machine.

Further objects are to provide a machine with a uniform and simple feeding mechanism and a machine in which the dies will act upon the bottle and cap with a uniform pressure, irrespective of irregularities in the bottle.

Further objects are to provide an arrangement for easily controlling the speed of such a machine, and to provide a machine which is simple in construction, easy to manipulate and not likely to get out of order.

Further objects, features and advantages will more clearly appear from the detailed description given below taken in connection with the accompanying drawings which form a part of this specification, but it is to be understood that changes, variations and modifications can be resorted to, which come within the scope of the claims hereunto appended.

Figure 1:
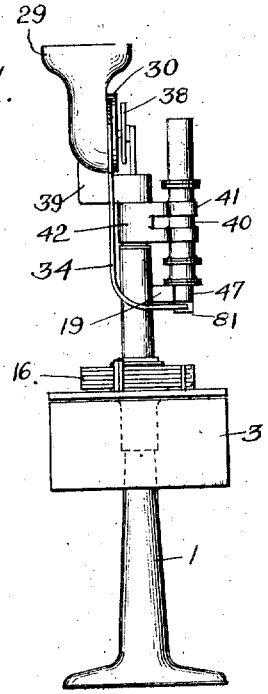
Figure 2:
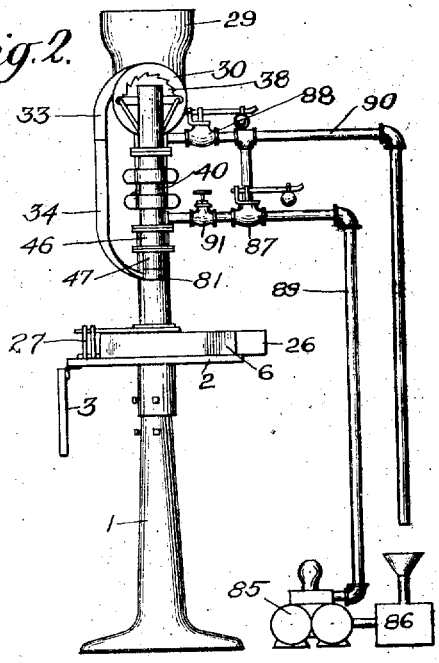
Figure 3:
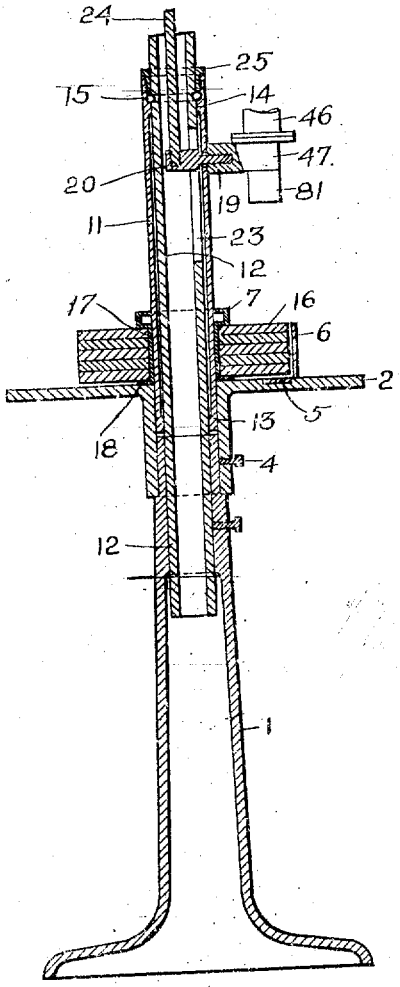
Figure 4:
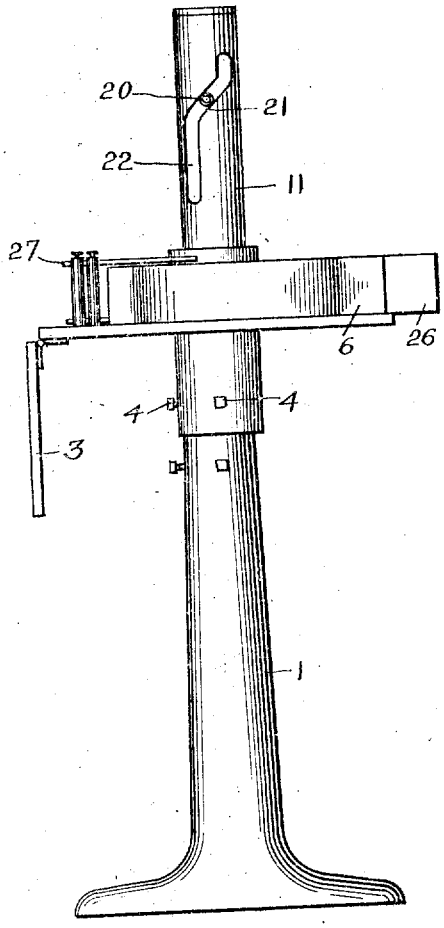
Figure 6:
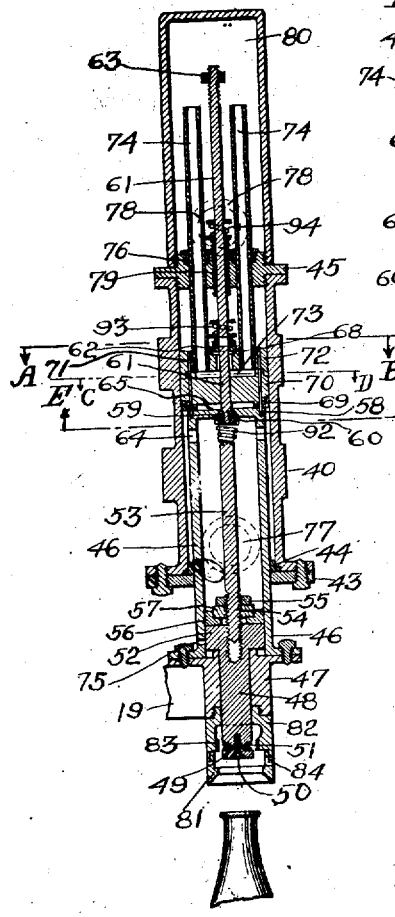
Figure 8:
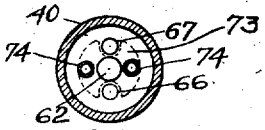
Figure 9:
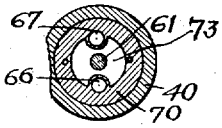
Figure 10:
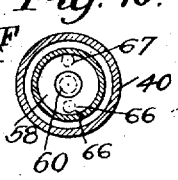
Figure 7:
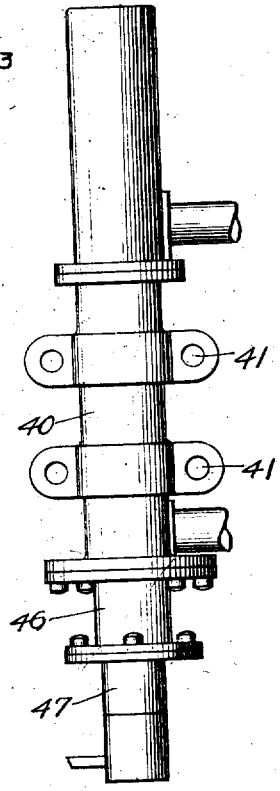
Figure 11:
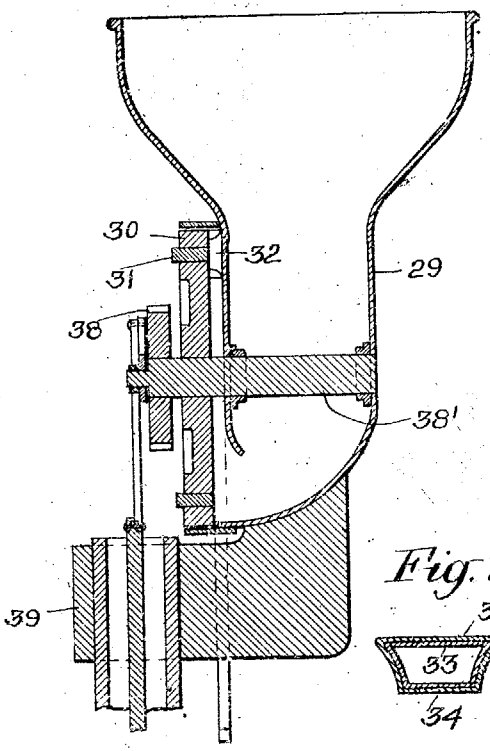
Figure 12A:
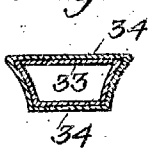
Figure 12:
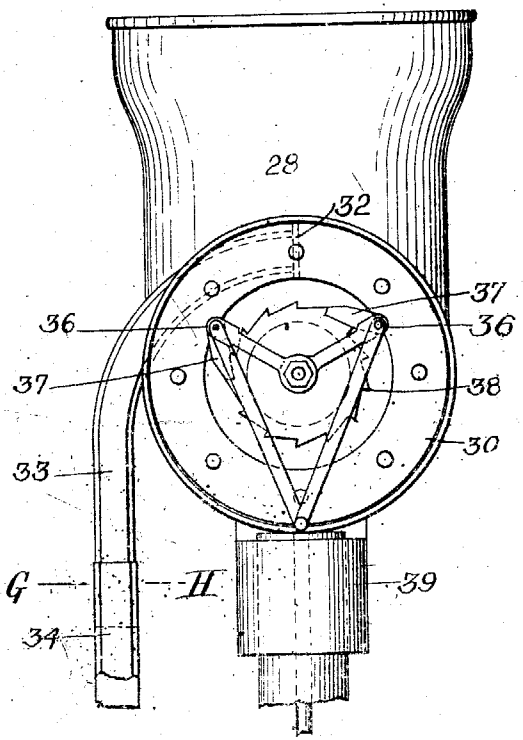
Figure 13:
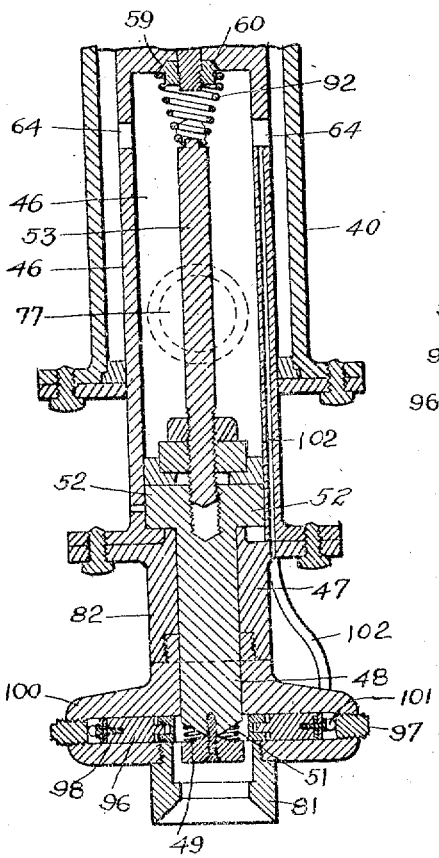
Figure 14:
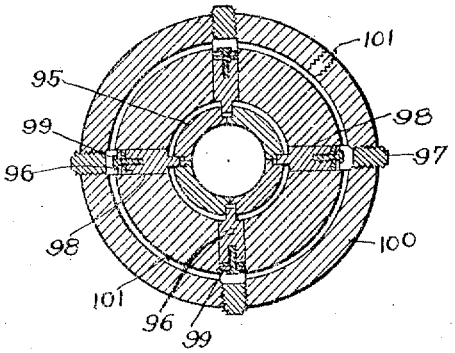

In the drawings, Figure 1 is a view of the entire machine in elevation; Fig. 2 is a view in elevation of the entire machine, taken at right angles to that shown in Fig. 1; Fig. 3 is an enlarged view in elevation in section, showing the bottle feeding mechanism; Fig. 4 is a view in elevation taken at right angles to that shown in Fig. 3 with the capping head removed; Fig. 5 is a plan view showing the table and feeding fingers, the machine support being shown in section; Fig. 6 is a view in elevation taken in section through the operating cylinders, showing the valve arrangement; Fig. 7 is a view in elevation taken at right angles to that shown in Fig. 6; Fig. 8 is a section taken on line "A B" of Fig. 6; Fig. 9 is a section taken on line "C D" of Fig. 6; Fig. 10 is a section taken on line "E F" of Fig. 6; Fig. 11 is a sectional view in elevation of the hopper; Fig. 12 is a view in elevation taken at right angles to that shown in Fig. 11; Fig. 12[a] is a section, enlarged, taken on the line G—H of Fig. 12; Fig. 13 shows a view in section of a modified form of the crimping or securing die showing the automatic means of the adjustment of the same; and Fig. 14 is a plan view in section of the modified form of the crimping die shown in Fig. 13.

Similar numerals refer to similar parts throughout the several views.

1 is the column which forms the base upon which the machine rests.

2 is the table adjustably secured to column 1 by set screws 4 and may be raised to accommodate it to the filling machine (not shown) against which it is placed.

3 is a leaf hinged to table 2.

5 is a rubber pad let into table 2 and flush therewith, and upon which the bottle rests while being capped.

6 is a fence for retaining the bottles in proper position on table 2.

7 is the pawl chamber in which operate pawls 8, 9 being the springs to keep the pawls engaged, and 10 are the teeth on sleeve 11 with which the pawls engage, the pawls being pivoted to pawl chamber 7 having an outside sleeve 17 attached thereto.

11 is a sleeve journaled on hollow shaft 12 at 13 and 14, and is hung near its upper end on ball bearing 15 working in a groove in hollow shaft 12.

16 are fingers which are secured to outside sleeve 17, which sleeve 17 at its upper end carries pawl chamber 7. Fingers 16 and outside sleeve 17 to which they are secured rest on and are secured to flange ring 18.

19 is an arm formed on the lower piston cylinder head 47, and carries pin 20 upon which is roller 21, which roller 21 oscillates sleeve 11 by means of cam slot 22, said cam slot 22 being arranged to give over a one-sixth of a turn of the sleeve 11 in the vertical movement or stroke of pin 20. Pin 20 operates through a straight vertical slot 23 in hollow shaft 12. Pin 20 operates hopper operating rod 24. Hollow shaft 12 is adjustably secured in column 1 for height to accommodate the various heights of bottles operated upon.

25 is a collar secured in the upper end of sleeve 11 to hold ball bearing 15 in position.

26 is a fence secured to table 2, and acts as a guide for the bottles coming from the filling machine.

27 are throwing off guides, one of which operates between table 2 and fingers 16, and the other operating just above fingers 16, both guides being secured to table 2.

28 is the hopper which consists of shell 29, at the side of which revolves disk 30 (Figs. 11 and 12). In disk 30 are magnets 31 arranged so as to come in contact with caps in the hopper. In the line of rotation of the magnets 31 is gage 32, fitting the caps when in proper position and through which such caps as are in position may pass and enter chute 33, the caps which are not in proper position on the magnets being wiped off by the gage.

34 is the lower chute telescoping over the lower end of the chute 33 and secured at its lower end to cap holder 81, so that as cap holder 81 moves up and down it forces the upper end of chute 34 to slide over the lower end of chute 33, which is secured to the hopper shell 29.

36 is the pawl frame loosely mounted on the front end of shaft 38′ to which frame are attached pawls 37, which pawls operate ratchet 38 and disk 30 both secured to shaft 38′ to rotate together.

Hopper shell 29 is secured to hollow shaft 12, by means of hopper base 39.

40 is the main cylinder which is secured to hollow shaft 12, by means of lugs 41 and collar 42 (Figs. 1, 2, 6 and 7). At the lower end of main cylinder 40 is secured lower cylinder head 43 and packing 44.

45 is the upper main cylinder head.

Through lower cylinder head 43 (Figs. 6 and 7) operates piston cylinder 46, to which is secured lower piston cylinder head 47, through which latter head operates piston 48, the lower end of which carries the cap hold down 49, by means of a pivot or screw 50, which screw allows of angular adjustment, the hold down 49 being maintained in normal position by spring 51. To piston 48 is secured piston head 52, which operates in piston cylinder 46. Piston head 52 carries adjustable valve operating rod 53, which may be adjusted by screw threads 54 and lock nut 55 above washer 57. This adjustment together with the adjustment of adjustable sleeve 79, controls the relative stroke of cap hold down 49, and capping die 83, required by different heights of caps. Piston 52 is packed in piston cylinder 46 by cup washer 56, which cup washer is spread by washer 57 and secured by lock nut 55. The upper end of piston cylinder 46 is formed into a head 58 in which is a valve opening with its seat 59. Valve 60 operates on valve seat 59, and is attached to valve stem 61, which is a long stem operating through adjustable sleeve 79 and main piston head 72, and having secured thereon valve 62 and reverse stop 63. In the upper end of piston cylinder 46 are openings or holes 64, to allow uninterrupted communication between main cylinder 40 and piston cylinder 46.

65 is a space connecting passages 66 and 67 with the port at valve 60. Passages 66 and 67 open into the upper end of main cylinder 40, thus forming when valve 60 is open a direct passage between piston cylinder 46 and the upper end of main cylinder 40.

69 is a cup washer, packing the piston cylinder 46 in main cylinder 40, and is held in place by junk piece 70, through which the passages 66 and 67 extend, and through which valve stem 61 operates.

71 are bolts for holding main piston head 72, junk piece 70, and cup washer 69 to piston cylinder head 58. Between main piston 72 and junk piece 70 is exhaust passage 73. In main piston head 72 is valve seat 68, on which seats valve 62. In main piston head 72 are secured exhaust pipes 74, which pipes operate through main cylinder head 45, and are packed therein by cup washers 76.

77 is the main inlet, and 78 is the exhaust or outlet leading from the exhaust chamber 80.

79 is an adjustable sleeve in piston head 45, and forms the upper valve check, and causes an automatic reverse. Through this sleeve operates valve stem 61.

81 is the cap holder secured to die block 82, which block is secured to lower cylinder head 47.

83 is the capping die secured to die block 82.

84 is an opening in cap holder 81, through which the caps enter from telescopic connector 34.

85 is the operating pump, drawing its supply from reservoir 86.

87 is an automatic pressure relief valve in the main line of piping 89, between the pump and the main cylinder, and discharges its overflow into the reservoir.

88 is an automatic pressure valve in the exhaust line of pipe 90, and will not allow any fluid to reach the exhaust, until a certain pressure is reached.

90 is the discharge pipe connecting the exhaust outlet 78 with the reservoir 86.

91 is the control valve in main line of pipe 89.

92 is a spring secured to the top end of adjustable valve operating rod 53 and closes the valve 60 quickly after the cylinder 46 has moved a predetermined distance relatively to the piston 52. 93 is a spring operating in a similar manner, between adjustable sleeve 79 and valve 62. 94 is a spring which operates in a similar manner, between adjustable sleeve 79 and reverse stop 63.

75 is an opening in the lower end of piston cylinder 46, forming a relief from the rear of piston 52 to permit the escape of fluids which might get under said piston.

In the modified form of my crimping die shown in Figs. 13 and 14, 95 is a sectional die held in place and operated upon by pistons 96 which operate in cylindrical holes 98.

97 are adjusting screws which form the cylinder heads for the purpose of limiting the movement of piston 96.

99 are cup washer packings secured to pistons 96.

100 is a die holder in which are formed the cylindrical holes 98.

101 is a fluid passage connecting all of the cylindrical holes and is formed in the die holder 100.

102 is a fluid passage in the walls of piston cylinder 46 and in a pipe below said cylinder connecting cylinder 46 near the upper end thereof with fluid passage 101.

The operation of the described embodiment of my invention is as follows: The bottles having been filled by a filling machine, are delivered to the table between fences 6 and 26, the latter guiding them off of the filling machine platform and into position to be operated upon by one of the fingers 16 which carry the bottles into position for capping on the rubber pad 5. Assuming that a bottle has just been capped and that the capping head is ascending from the bottle but has not quite reached its extreme upward movement, the position of the parts will be as shown in the drawings (Figs. 3, 4, 6 and 13 being the more important figures to be considered in the following statement of operation). In this position of the apparatus the fluid is being admitted through inlet port 77 into cylinder 46 and is exerting downward pressure upon the hold-down-cap piston 52 to hold it in the lower end of cylinder 46, and is exerting pressure upon the upper end 58 of cylinder 46 and upon the cup washer 69, to force the main piston head 72 and its attached capping parts upward, the valve 60 during this time being closed to prevent the flow of fluid to the upper surface of the piston head 72, and the valve 62 being open to permit the fluid in the upper end of cylinder 40 above the piston head 72 to discharge through said valve 62, exhaust passage 73, and through pipes 74 to the exhaust chamber 80 and thence through the exhaust port 78. Referring to Figs. 3 and 4, as the capping head continues to ascend, it is guided vertically by the engagement of pin 20 with the slot 23 in sleeve 12; and roller 21 mounted on said pin engaging the upper curved portion of slot 22 in the sleeve 11 (Fig. 4) causes the sleeve 11 and the finger 16 to be moved to the left a sixth of a revolution, thereby bringing the next filled bottle into position on the rubber pad. The capping head cylinder 46 continues to ascend until the upper end of spring 93 engages the lower end of sleeve 79 serving as an upper stop or abutment for the spring 93, whereupon valve stem 61 carrying valve 62 is thrust downward by spring 93, closing the valve 62 and opening valve 60 carried at the lower end of the rod 61. During the upward movement of the parts the spring 92 between valve rod 53 and valve 60 was placed under slight tension, but this was insufficient to open valve 60 against the fluid pressure exerted on the lower surface of the valve, and the valve thus remained closed as stated, until spring 93 on rod 61 engaged the lower end of sleeve 79, whereupon valve 60 was immediately opened and valve 62 immediately closed with a quick action. This feature of having these valves 60 and 62 held open until the limit of the desired movements of the parts and then quickly closed is very important, since it will be seen that without some such provision, just before the parts reach their extreme upward movement, valve 62 would commence to close and valve 60 commence to open, whereupon fluid would flow directly from cylinder 46 through the partly opened valve 60, passage 73, passageways 66, 67 (Figs. 8–10), into the upper end of cylinder 40 and through the partly closed valve 62 and pipes 74 into the exhaust chamber 80, whereupon the apparatus might stop. The closing of the valve 62 cuts off the exhaust of fluid from the upper end of the cylinder 40 above the head 72 through passage 73 and pipes 74, and the opening of valve 60 admits fluid pressure from inner cylinder 46 through the valve 60 into the passage 65, and through openings 66, 67 (Figs. 8 and 9), passing through junk piece 70 and head 72 and opening directly into the upper end of cylinder 40 above head 72; whereupon the head 72 with the attached cylinder 46 and capping parts is moved downward due to the greater effective area of the upper surface of head 72 presented to the fluid pressure as compared to the effective area below said head. The head 72 with its capping parts continues to descend with the respective capping parts remaining in their relative positions until cap-hold-down 49 presses the cap upon the bottle (a cap having in the meantime passed through cap chute 34 in position in cap holder 81 to be pressed upon the top of the bottle by cap-hold-down head 49), whereupon the downward movement of the cap-hold-down piston 48 is arrested, but capping head 72, carrying the cylinder 46 with its lower cylinder head 47, carrying the crimping dies 95, continues to descend with respect to the cap-hold-down piston 48 until the valve 60 is closed and valve 62 opened by the compression of spring 92 due to relative movement between the cap-hold-down piston 48 and the cylinder head 47. The crimping dies 95 are at all times forced inwardly by the fluid pressure which flows from the main cylinder 40 through passage 102, passage 101, into the spaces back of the piston 96, so that the crimping dies as they are brought down to the cap at once force the rim or flange inward by fluid pressure to crimp the cap beneath or around the lip or crown of the bottle.

The valve 60 having been closed and the valve 62 opened as a result of the relative movement between piston 48 and head 47, the fluid above the main cylinder head 72 is now exhausted through valve 62 and pipe 74 into the exhaust cylinder 80 and the head 72 carrying the cylinder 46 and its head 47 is now moved upward while the cap-hold-down piston 48 remains firmly pressed upon the cap by fluid pressure on piston head 52 until the lower side of the head 52 of this piston is engaged by the upper end of the cylinder head 47. This relative movement is sufficient to permit the capping die to be withdrawn free of the bottle before the cap-hold-down is lifted from the cap, whereupon a cap is immediately fed into position in the cap holder 81 for the next capping operation. The capping head parts all continue to move upward together until spring 93 again engages the lower end of sleeve 79, whereupon valve 62 is immediately closed with a quick, sudden movement and valve 60 similarly opened, whereupon the parts commence to descend to cap the next bottle, etc.

From the previous description of the operation of the parts, it will be understood that should no bottle be placed under the capping head, the downward movement of the parts will nevertheless be stopped and the upward movement commenced by the closing of valve 60 and the opening of valve 62 by the engagement of reverse stop 63 at the upper end of rod 61 with spring 94 at the upper end of sleeve 79, which takes place when the main piston head 72 reaches the lower extremity of its desired travel, giving valve rod 61 a quick upward thrust to operate these valves.

It will be observed that the adjustable valve operating rod 53, carrying the spring 92 at its upper end, is adjusted according to the height of the caps, so as to permit such relative movement between piston 48 and head 47 as will allow the die 95 carried by the head 47 to pass down to the side of the cap so that it will be in position to crimp the cap and clench it on the lip or rim of the bottle. It will also be observed that the cap is pressed down upon the bottle with automatically regulated pressure, and that fluid pressure is continuously exerted upon piston head 52 to press the cap firmly upon the bottle, not only during the time while the cylinder head 47 carrying the dies is descending and while the dies are crimping the cap around the bottle lip, but also during the withdrawal of the dies from the cap by the upward movement of cylinder head 47 and until the dies are clear of the cap, at which time the upper end of the cylinder head 47, by engaging the lower surface of the piston head 52, will withdraw the cap-hold-down member 49 from the cap.

It will also be noted that the pressure with which the dies act to crimp the caps on the bottles is determined by the pressure at which the pressure relief valve 87 is set to operate to permit the fluid to pass through the by-pass pipe to the discharge pipe 90. The speed of the apparatus is largely determined by the difference in pressure at which the pressure relief valves 87 and 88 are set to open, so that the speed may be regulated without changing the pressure with which the dies act, and vice versa.

From the above it will be clear that I have provided a machine of the class described in which the reverse movement is dependent upon a predetermined relative movement between the two fluid pressure operated elements, so that if irregular bottles of different heights are brought into operative position in the machine the capping mechanism is automatically adjusted to all such bottles and there is no tendency to break the bottles or injure the machine. Thus, as soon as the crimping dies pass a certain distance beyond the top of the bottle a reverse movement is automatically produced. It will also be noticed that when the reciprocating elements move upward a reverse movement is caused automatically by the spring 93 that is responsive to a predetermined movement of the crimping means away from the bottle holding means. Furthermore, the arrangement of the two operating pistons one within the other, with the automatic control valves 60 and 62, forms a simple automatic means for controlling the reciprocations of the pistons, as desired. By arranging the main piston head with a port therethrough, the valves 60 and 62 controlling this port and the exhaust port are conveniently arranged to be operated by the relative predetermined movement of one piston with respect to the other.

By arranging the crimping dies 95 to be pressed inwardly by fluid pressure the dies will operate equally well upon the mouths of bottles of irregular shape and will not be liable to cause breakage of the bottles nor will injury be caused to the dies because of such irregular shape. Furthermore, the valves 87, 88 and 91 form suitable means for regulating the operating fluid pressure and the speed of the machine by checking the flow of fluid through the machine and the pressure of the fluid supplied, when a predetermined pressure of fluid is reached, and checking the exhaust of the fluid until a predetermined pressure is reached. The fingers 16 act automatically to move the bottles in the operative position on the table and the chutes 33 and 34 deliver the caps automatically to the capping head. The chute 34 being rigidly connected with the head is always in position to deliver a cap thereto at the proper time and cannot get out of register with the head. By arranging a main working piston with different effective pressure areas on its reverse working side I am enabled to obtain all the parts in a small space, with the hold-down piston 52 within the main piston cylinder, whereby the various parts are efficiently and simply arranged.

Where, in the appended claims, I have referred to the cap-hold-down element and the crimping dies by such terms as "cap-hold-down means, die, device or member" and "cap-crimping means, dies or members," I do not wish to be understood as limiting these claims to any particular device or arrangement for holding down and crimping the caps, for obviously various forms of cap-crimping dies may be used, and the cap-hold-down means may, if desired, be simply the extension of the piston, without any special provision, although the form shown has its advantages.

Having thus described my invention, what I claim and desire to secure by Letters Patent is:—

1. Bottle capping apparatus comprising a bottle support, devices for securing the caps to the bottles embracing a cap-hold-down member and coöperating crimping means, and means operatively controlled by a predetermined movement of the crimping means with respect to the cap-hold-down member for causing the securing devices to be withdrawn from the bottle after a cap is secured thereon.

2. In a bottle capping machine, the combination of a bottle support, a reciprocatory capping plunger controlled by fluid pressure in its capping operation, devices carried by said plunger for securing a cap upon a bottle embracing crimping means and a relatively movable coöperating cap-hold-down member, and means operatively controlled by relative movement of the plunger with respect to the cap-hold-down member for controlling the fluid pressure to prevent further downward movement of the reciprocatory capping plunger after the cap is secured upon the bottle.

3. In a bottle capping machine, the combination of a bottle support, a cylinder and a coöperating fluid pressure controlled capping piston, devices carried by the piston for securing a cap upon a bottle embracing crimping means and a relatively movable coöperating cap-hold-down member, and means operatively controlled by a predetermined movement of the crimping means with respect to the cap-hold-down member for exhausting fluid from the cylinder above the piston after the cap is secured on the bottle.

4. Bottle capping apparatus comprising a bottle support, two fluid pressure operated pistons, devices carried thereby for securing the caps to the bottles, and means for controlling the movement of the pistons to cause the securing devices to be withdrawn from the bottle after a cap is secured thereon, said means embracing devices carried by one piston and devices carried by the other piston coöperating therewith for causing a reverse movement of both pistons under fluid pressure.

5. The combination of a bottle support, two relatively movable fluid pressure operated pistons, a cap-hold-down member carried by one piston, cap-crimping means carried by the other piston, means operatively controlled by the relative movement of the pistons for controlling the action of the fluid to cause the withdrawal of the piston carrying the crimping means without removing the cap-hold-down member, and connections between the cap-hold-down member and the crimping means for removing the hold-down member, whereby the cap-hold-down is pressed against the cap by fluid pressure until the crimping means has been withdrawn past the hold-down member.

6. Bottle capping apparatus comprising a bottle support, two fluid pressure operated pistons, devices carried thereby for securing the caps to the bottles, and means for controlling the movement of the pistons to cause the securing devices to be withdrawn from the bottle after a cap is secured thereon, said controlling means embracing a valved port through one of said pistons.

7. In a bottle capping machine, the combination of a cylinder, a coöperating fluid pressure controlled capping piston, a coöperating cap-hold-down piston, devices carried by said pistons for securing caps upon bottles, and means for exhausting fluid from the cylinder above the capping piston after the cap is secured upon the bottle, said means including a valve member carried by one piston and controlling the exhaust of the fluid from the cylinder.

8. In a bottle capping machine, the combination of a cylinder, a coöperating fluid pressure controlled capping piston, a coöperating cap-hold-down piston, devices carried by said pistons for securing caps upon bottles, and means for exhausting fluid from the cylinder above the capping piston after the cap is secured upon the bottle, said means including a member slidably mounted on the capping piston for controlling the exhaust of the fluid from the cylinder.

9. Bottle capping apparatus comprising two fluid pressure operated pistons, devices carried thereby for securing the caps on the bottles, a cylinder for one of the pistons and an exhaust tube carried by one piston and sliding through the head of said cylinder.

10. In a bottle capping machine, the combination of a cylinder, a coöperating fluid pressure controlled piston, a cap-hold-down piston operatively related to the first piston, devices carried by said pistons for securing a cap upon a bottle, and means for exhausting fluid from the cylinder including an exhaust tube carried by one piston and slidable through the head of the cylinder.

11. In a bottle capping machine, the combination of a cylinder, a coöperating fluid pressure controlled capping piston, a coöperating relatively movable cap-hold-down piston, an exhaust chamber above the cylinder, and means for exhausting fluid from the cylinder above the capping piston when the bottle is capped, said means embracing an exhaust tube carried by one piston and passing slidably through the head of the cylinder and an exhaust port controlling the flow of fluid through the tube and opened responsive to relative movement between the pistons in securing the cap upon the bottle.

12. Bottle capping apparatus comprising a bottle support, two fluid pressure operated pistons, devices carried thereby for securing the caps to the bottles, and means for controlling the movement of the pistons to cause the securing devices to be withdrawn from the bottle after a cap is secured thereon, said means embracing a valve carried by one piston to cause the space on one side thereof to be exhausted.

13. Bottle capping apparatus comprising a bottle support, two fluid pressure operated pistons, devices carried thereby for securing the caps to the bottles, and means operatively controlled automatically by the movements of the apparatus for controlling the movement of the pistons to cause the securing devices to be withdrawn from the bottle after a cap is secured thereon and for causing the pistons to automatically move toward the bottles.

14. Bottle capping apparatus comprising a bottle support, two fluid pressure operated pistons, devices carried thereby for securing the caps to the bottles, and means for controlling the movement of the pistons to cause the securing devices to be withdrawn from the bottle after a cap is secured thereon, said means embracing a valve carried by one piston to cause the space on one side thereof to be exhausted and means for operating said valve at a certain point in the movement of the pistons toward the bottle support when no bottle is present.

15. In a bottle capping machine, the combination of a cylinder and a fluid pressure controlled capping piston for the cylinder, a second cylinder carried at the underneath side of said piston, a second piston slidably mounted in said second cylinder, said pistons having provision for securing caps upon bottles, and means for exhausting fluid from the first cylinder above the first piston after a cap is secured on the bottle.

16. Bottle capping apparatus comprising a bottle support, two fluid pressure operated pistons, devices carried thereby for securing the caps to the bottles, means for controlling the movement of the pistons to cause the securing devices to be withdrawn from the bottle after a cap is secured thereon and a cylinder for each piston, one of the cylinders being carried on the underneath side of one of the pistons.

17. Bottle capping apparatus comprising a bottle support, two fluid pressure operated pistons, devices carried thereby for securing the caps to the bottles, and means for controlling the movement of the pistons to cause the securing devices to be withdrawn from the bottle after a cap is secured thereon and a cylinder for each piston, one of the cylinders being carried on the underneath side of one of the pistons, and said cylinders being connected by always open ports so that one piston will be held down while the other is partially withdrawn.

18. Bottle capping apparatus comprising fluid pressure operated capping means, a pipe for supplying fluid under pressure thereto, an exhaust pipe therefor, a by-pass pipe extending between the supply pipe and the exhaust pipe, a safety valve in the by-pass pipe limiting the pressure at which the fluid is supplied to the capping means and a safety valve in the exhaust pipe for creating a certain back pressure therein.

19. A machine for capping bottles or the like, having reciprocating fluid pressure operated devices for securing caps to the bottles or the like, including fluid pressure operated crimping dies, means for automatically controlling the reciprocations of said devices, a passage supplying fluid under pressure thereto, a passage for exhausting the fluid therefrom, means for regulating the pressure of the fluid supplied, and means for independently regulating the pressure of the fluid exhaust whereby the speed of fluid pressure operated devices may be regulated without changing the pressure with which the devices operate and vice versa.

20. In a fluid pressure operated bottle capping machine, a pair of fluid pressure operated elements for holding and crimping a cap upon a bottle, means for supplying fluid under pressure to said elements to cause them to shift to operative position, and automatic means for changing the action of the fluid upon said elements for causing them to move away from the bottle, and for causing the repetition of said movements, in combination with an automatic bottle feeding mechanism working in time relation therewith.

21. A bottle capping machine or the like, having in combination a main cylinder with a port for admission of fluid thereto, a main fluid pressure operated piston in said cylinder, a cylinder carried at the lower side of the main piston within said main cylinder and of such diameter as to provide a space for fluid between its outer wall and the inner wall of the main cylinder, said inner cylinder having a port for admitting fluid thereto, a piston carried at the lower end of the inner cylinder and operated therein by fluid pressure, a valved port for admitting fluid from one side of the main piston to the other side thereof, an exhaust port through which the fluid is exhausted from the main cylinder above the main piston, the lower end of the inner cylinder and the piston operating therein having provision for holding a cap down upon a bottle and securing it thereto, and having relative movement during said operation, and an automatically operated valve controlling flow of fluid to the upper surface of the main piston and actuated after said relative movement of said last mentioned cylinder and lower piston for effecting the return of said piston and cylinder from the bottle.

22. A bottle capping machine or the like having in combination a fluid pressure operated element for holding the cap upon the bottle, a fluid pressure operated element for securing the cap to the bottle, and means operatively controlled by a predetermined movement of one of said elements relative to the other of said elements for causing said elements to move away from the bottle.

23. Bottle capping apparatus comprising a bottle support, devices for securing the caps to the bottles, embracing a cap-hold-down member and coöperating crimping means, and means operatively controlled by a predetermined movement of the crimping means with respect to the cap-hold-down member for causing the securing devices to be withdrawn from the bottle after a cap is secured thereon, said means embracing devices for automatically causing the securing devices to move toward another bottle to secure a cap thereon.

24. A bottle capping machine or the like having in combination a cylinder, a fluid pressure operated piston cylinder operating in said cylinder, a die carried by said piston cylinder for crimping or securing the caps to the bottles or the like, a fluid pressure operated piston operating in said piston cylinder, means carried by said piston for holding the cap or the like, and means operatively controlled by a predetermined relative movement between said piston cylinder and piston irrespective of variations in the bottles operated upon for causing said piston cylinder and piston to move away from the bottle.

25. A bottle capping machine or the like having in combination a pair of fluid pressure operating elements for holding and crimping or securing a cap upon a bottle or the like, means for causing said elements to move away from the bottles after the capping operation, responsive to a predetermined movement of one element relative to the other, and for causing said elements to move toward the bottles responsive to a predetermined movement of the elements.

26. A bottle capping machine or the like, having in combination a pair of fluid pressure operated pistons for holding and clenching a cap on a bottle or the like, a passage supplying fluid under pressure to said pistons, a passage for exhausting the fluid from said pistons, a safety valve in the supply passage for limiting the supply pressure of the apparatus, a safety valve in said exhaust passage for limiting the exhaust pressure of the apparatus, and means for causing said pistons to move away from the bottle dependent on a predetermined relative movement between the pistons.

27. A bottle capping machine or the like, having in combination, a pair of reciprocating fluid pressure operated pistons carrying cap holding and crimping mechanism, means for automatically feeding caps to operative position with respect to the bottles and crimping means, and an automatic valve device for causing repetition of the reciprocations of the pistons automatically.

28. In a bottle capping machine or the like, a bottle support, a die for pressing a cap to the bottle, a die for crimping a cap on the bottle, means for moving said dies by fluid pressure to the bottle and continuing the movement of the crimping die after the holding die has stopped and presses a cap on the bottle, and means operatively controlled by the relative movement of said dies for causing a reverse movement of the crimping die moving means while the holding die still presses the cap on the bottle.

29. In a bottle capping machine or the like, a bottle support, a die for pressing a cap to the bottle, a die for crimping a cap on the bottle, relatively movable means for moving said dies by fluid pressure to the bottle and continuing the movement of the crimping die after the holding die has stopped and presses a cap on the bottle, and means operatively controlled by the relative movement of said dies for causing a reverse movement of the crimping die moving means while the holding die still presses the cap on the bottle, and means for causing a reverse movement of the holding die moving means when the crimping die has moved away from the bottle a predetermined distance.

30. A machine for capping bottles or the like, having reciprocating fluid pressure operated devices for securing caps to the bottles or the like, a passage supplying fluid under pressure thereto, a passage for exhausting the fluid therefrom, means for regulating the pressure of the fluid supplied, and means for independently regulating the pressure of the fluid exhaust, whereby the speed of fluid pressure operated devices may be regulated without changing the pressure with which the devices operate, and vice versa.

31. A bottle capping machine or the like having, in combination, a pair of reciprocating fluid pressure operated pistons carrying cap holding and crimping means, mechanism for feeding caps to operative position with respect to the bottles, and an automatically operated valve device controlling the pistons to cause a reversal of their movements in both directions, whereby repetitions of the reciprocations of the pistons are automatically produced.

32. In a fluid operated bottle capping machine or the like, a cylinder, a die carrying piston operating in said cylinder having different effective working areas on its reverse working sides and provided with a passage for fluid therethrough, and means for controlling the flow of operating fluid through said piston whereby the fluid may at one time operate only upon one of said areas and at another time operate on both of said areas, and means whereby the fluid acting on the larger of said areas may be exhausted.

33. In a fluid-operated bottle capping machine, the combination of crimping dies and means for maintaining a uniform pressure on the crimping dies in crimping a cap on a bottle irrespective of the irregularities in the neck or crown of the bottle, said means comprising fluid-operated means for moving the dies and means for connecting said moving means with the fluid pressure maintained within the machine.

34. A bottle capping machine or the like having in combination a cylinder, a fluid pressure operated piston operating in said cylinder, a second cylinder secured to said piston, a second fluid pressure operated piston operating in said second cylinder, means for holding down the cap or the like carried by said second piston, means for crimping or securing the cap or the like in place carried by said first piston, said first piston having a port therethrough, a valve for opening and closing said port, and means carried by the second piston for opening and closing said valve.

35. A bottle capping machine or the like having in combination a main cylinder, a fluid pressure operated piston and cylinder therein, a second fluid pressure operated piston operating in said last mentioned cylinder, the first piston having a port therethrough for connecting one end of the main cylinder with the other end thereof, means for opening and closing said port dependent upon a predetermined relative movement between the two pistons, a cap holding means carried by one piston and a cap crimping means carried by the other piston.

36. A bottle capping machine or the like having in combination a main cylinder, a fluid pressure operated piston and cylinder therein, a second fluid pressure operated piston operating in said last mentioned cylinder the first piston having a port therethrough for connecting one end of the main cylinder with the other end thereof, an exhaust port carried by said first cylinder, valves for opening and closing said ports, means for operating said valves dependent upon certain predetermined relative movements between the two pistons, a cap holding means carried by one piston, and a cap crimping means carried by the other piston.

37. A bottle capping machine or the like having in combination a main cylinder, a fluid pressure operated piston operating therein, a second cylinder connected to said piston, a second piston operating in the last mentioned cylinder, an exhaust port carried by said first piston, a valve for opening and closing said exhaust port, means for operating said valve responsive to a predetermined movement of one piston relative to the other, a cap holding means carried by one piston and a cap crimping means carried by the other piston.

38. A bottle capping machine or the like having in combination, a main cylinder, a fluid pressure operated piston operating therein, a second cylinder connected to said piston, a second piston operating in the last mentioned cylinder, an exhaust port carried by said first piston and embracing a pipe extending and reciprocating through the head of the main cylinder, a valve for opening and closing said exhaust port, means for operating said valve responsive to a predetermined movement of one piston relative to the other, a cap holding means carried by one piston and a cap crimping means carried by the other piston.

39. A bottle capping machine or the like, having in combination a pair of fluid pressure operating elements for holding and crimping or securing a cap upon a bottle or the like, and means for causing said elements to move toward the bottles responsive to a predetermined movement of the elements.

40. A bottle capping machine or the like, having in combination a main cylinder, a piston and second cylinder operating therein, a second piston operating in the second cylinder, a cap holding means carried by one piston and a cap crimping means carried by the other piston, and means for causing said pistons to move toward the bottles responsive to a predetermined movement of the pistons away from the bottles or the like.

41. A bottle capping machine or the like having in combination a cylinder, a fluid pressure operated piston operating in said cylinder, a second cylinder secured to said piston, a second fluid pressure operated piston operating in said second cylinder, means for holding down the cap or the like carried by said second piston, means for crimping or securing the cap or the like in place carried by said first piston, said first piston having a port therethrough, a valve for opening and closing said port, a member carried by the second piston and a spring operating between said member and valve for closing the valve.

42. A bottle capping machine or the like having in combination a pair of fluid pressure operating elements for holding and crimping or securing a cap upon a bottle or the like, means for causing said elements to move toward the bottles responsive to a predetermined movement of the elements, said means embracing a valve carried by one of the elements for controlling the application of fluid pressure to operate the elements, and a spring operating between said valve and a fixed part of the machine for closing said valve.

43. A bottle capping machine or the like having in combination a fluid pressure operated means for holding the cap upon the bottle or the like, and a fluid pressure operated means for crimping the cap upon the bottle or the like, said last mentioned means embracing crimping dies cushioned by fluid pressure to produce the crimping action.

44. A bottle capping machine or the like having in combination means for holding the cap on the bottle or the like, and means for crimping the cap upon the bottle or the like, said last mentioned means embracing a plurality of crimping dies each forced by fluid pressure to crimp the cap on the bottle or the like.

45. In a bottle capping machine or the like a cap crimping head embracing a plurality of crimping dies and a plurality of pistons for forcing said dies laterally by fluid pressure to crimp the caps on the bottles or the like.

46. In a bottle capping machine or the like, a fluid pressure operated cap holding means, and fluid pressure operated vertically reciprocating cap crimping means, said last mentioned means embracing a plurality of crimping dies forced laterally by fluid pressure to crimp the caps on the bottles or the like.

47. In a bottle capping machine or the like, means for holding the bottle or the like, means movable relatively to the holding means and bottle for crimping a cap upon the bottle, means for causing the crimping means to move relatively toward the holding means responsive to a predetermined movement thereof away from the holding means, and means for causing a reverse relative movement of the holding means and crimping means responsive to a certain predetermined movement of the crimping means with respect to the bottle, whereby the machine automatically adjusts itself for bottles of varying heights.

48. A bottle capping apparatus or the like having in combination, fluid pressure operated means for clenching a cap upon a bottle or the like, means for supplying an operating fluid to said means, means for checking the pressure of fluid supplied when a predetermined pressure of the fluid is reached, and means for checking the exhaust of the fluid from the apparatus until a predetermined pressure of exhaust fluid is reached.

49. A bottle capping apparatus or the like, having in combination, fluid pressure operated means for clenching a cap upon a bottle or the like, means for automatically causing the clenching means to move away from the bottle or the like, dependent upon a predetermined movement of the clenching means, means for supplying an operating fluid to the apparatus, and means for limiting the pressure of the fluid supplied to operate the clenching means.

50. A bottle capping machine or the like, having in combination, a cylinder, a piston cylinder operating in said cylinder, a piston operating in said piston cylinder, parts carried by said piston cylinder and piston for clenching a cap upon a bottle or the like, means for causing said piston cylinder and piston to move away from the bottle, and adjustable means carried by the piston for controlling said reversing means.

51. A bottle capping machine or the like, having in combination means for securing the caps on the bottles or the like, a hopper for the caps, a disk rotatable in a path in communication with the hopper, a plurality of magnets extending in parallel and horizontally in said disk whereby said disk will pick up caps from the hopper by magnetic attraction, the caps attaching themselves to the vertical side of the disk, and means for conveying the caps from the disk to said cap securing means.

52. A fluid operated bottle capping machine or the like, having in combination a cylinder, a piston operating in said cylinder and carrying cap securing means, said piston having different effective pressure areas on its reverse working sides, means for admitting fluid through said piston from the smaller effective working area side of the piston to the larger effective working area side of the piston, and means for exhausting the fluid from said larger side.

53. A fluid operated bottle capping machine or the like, having in combination a cylinder, a piston operating in said cylinder and carrying cap securing means, said piston having different effective pressure areas on its reverse working sides, means for admitting fluid through said piston from the smaller effective working area side of the piston to the larger effective working area side of the piston, means for exhausting the fluid from said larger side, and means dependent on certain predetermined movements of the piston for controlling the operation of said admitting means and exhausting means.

54. A fluid pressure operated bottle capping machine, having in combination a piston chamber, a pair of fluid pressure operated pistons extending within said chamber and adapted when operated to hold a cap down and secure it upon a bottle, one of said pistons carrying an exhaust passage leading out of said chamber, means for establishing fluid communication between the ends of the chamber, means for establishing fluid communication between one end of the chamber and the exhaust passage, and means for supplying fluid under pressure to the other end of said chamber.

55. In a bottle capping machine or the like, a securing die comprising a plurality of separate sections for securing a bottle cap or the like in position, each section being provided with means whereby it may be pressed by fluid pressure, and means for supplying fluid under pressure thereto.

56. In a bottle capping machine, the combination of two relatively movable pistons having provision at their lower ends cooperating to secure a cap upon a bottle, said pistons having provision for automatic reversal of their movement, operatively controlled by predetermined relative movement between them, for withdrawing the said cap-securing means from the bottle after the cap has been secured.

57. In a bottle capping machine, the combination of two relatively movable power-operated pistons, one of said pistons having provision at its lower end for pressing a cap upon a bottle, crimping dies carried at the lower end of the other piston to crimp the cap on the bottle, the pistons being arranged so that the first piston presses the cap upon the bottle before the crimping dies are brought into operative position by the second piston, and means operatively controlled by the relative movement of the pistons, for controlling the reversal of the pistons to cause them to be automatically withdrawn from the bottle after the cap has been secured.

58. In a bottle capping machine, the combination of two relatively movable power-operated pistons having provision at their lower ends coöperating to secure a cap upon a bottle, the pistons being so arranged that one moves with respect to the other after said other has pressed the cap upon the bottle, and means operated responsive to predetermined relative movement between the pistons, for causing the reversal of the pistons after the cap is secured, said last mentioned means having provision for adjustment for varying the desired relative movement between the pistons to adapt them to caps and bottle crowns of different shapes.

59. In a bottle capping machine, the combination of a cylinder, two relatively movable fluid-pressure-operated pistons having provisions at their lower ends for pressing a cap upon a bottle and for then crimping the cap upon the bottle, said pistons being arranged to move one with respect to the other after said other has pressed a cap upon the bottle, a valve operatively related to the pistons and automatically operated after the relative movement between the pistons, for exhausting the fluid pressure from the cylinder to permit the withdrawal of the pistons from the bottle, and adjusting means for varying the desired relative movement between the pistons in securing the cap on the bottle, to adapt them to caps and bottle crowns of different shapes.

60. In a fluid-operated bottle capping machine, the combination of a cylinder, a plurality of relatively movable fluid-pressure-operated pistons having provision at their lower ends for pressing the cap upon the bottle and for then crimping the cap upon the bottle including a cap-hold-down part and coöperating cap-crimping dies, with means carried at the lower end of one of the pistons and operated therein by fluid pressure for forcing the crimping dies against the cap, and means connecting said last fluid pressure operating means with the cylinder for conveying fluid to operate said means.

61. In a fluid-operated bottle capping machine, the combination of a cylinder, a plurality of relatively movable fluid-pressure-operated pistons, a cap-hold-down part carried at the lower end of one of said pistons for engaging and pressing a cap upon a bottle, coöperating cap-crimping dies for crimping the cap upon the bottle, fluid-pressure-operated means for forcing the dies inward into engagement with the cap after the cap has been pressed upon the bottle by the hold-down part, and means controlled responsive to the relative movement between said pistons after the cap-hold-down part has engaged the bottle, for causing the release of the crimping dies from the cap.

62. In a fluid-operated bottle capping machine, the combination of a cylinder, a plurality of relatively movable fluid-pressure-operated pistons, a cap-hold-down part at the lower end of one of the pistons, coöperating crimping dies carried at the lower end of the other piston, fluid-pressure-operated means carried by said last piston for forcing said crimping dies into position to engage and crimp the cap, and means controlled responsive to predetermined relative movement between the pistons and operated immediately upon the completion of the relative movement, for exhausting the fluid pressure to permit the withdrawal of the pistons from the bottle.

63. In a fluid-pressure-operated bottle capping machine, the combination of a cylinder, a plurality of relatively movable fluid-pressure-operated pistons, one of said pistons having provision at its lower end for pressing a cap upon a bottle, coöperating cap-crimping dies carried by the other piston, said pistons being so arranged that the last piston is moved with respect to the other after said other has pressed a cap upon the bottle, and means operatively controlled by the relative movement of said pistons to cause automatic reversal of the crimping-die-carrying piston to withdraw the crimping dies after the cap has been secured to the bottle and to cause the cap-hold-down piston to be firmly pressed upon the cap until the crimping dies have been withdrawn.

64. In a fluid-pressure-operated bottle capping machine, the combination of a cylinder, a plurality of relatively movable fluid-pressure-operated pistons, one of said pistons having provision at its lower end for pressing the cap upon a bottle, coöperating cap-crimping dies carried by the other piston, the pistons being so arranged that the first piston presses the cap upon the bottle before the crimping dies are brought into operative position by the second piston, and valve mechanism controlling the fluid pressure, operatively controlled by the relative movement of the pistons, for causing the reversal of the second piston to withdraw the crimping dies from the cap, while maintaining the fluid pressure on the first piston until the dies have been withdrawn from the cap.

65. A bottle capping machine or the like, having in combination a main cylinder, a main fluid-pressure-operated piston in said cylinder, a cylinder carried at the lower end of said main piston and of less diameter than the main cylinder so as to provide a space between the outer wall of said inner cylinder and the inner wall of the outer cylinder for fluid, a port for admitting fluid to the main cylinder below the main piston during the reciprocations of the piston, a port for admitting fluid from the portion of the main cylinder below the main piston into the inner cylinder to maintain pressure therein during the reciprocations of the main piston, a piston carried at the lower end of the inner cylinder and having its upper surface constantly acted upon by fluid pressure to force it downward, said inner piston being adapted at its lower end to engage and press a cap upon a bottle and the lower end of said inner cylinder having provision for effecting the crimping of the cap upon the bottle while it is held down by the said inner piston and being movable relative to the inner piston, whereby it will move downward after the inner piston has engaged the cap and will be lifted by fluid pressure from the bottle before the cap is released by the inner piston, a valved port controlling the flow of fluid from the lower surface of the main piston to its upper surface controlled responsive to the relative movement of the inner cylinder and its piston during the cap-securing operation for returning said inner cylinder to move it away from the bottle, and a valved exhaust port controlling the flow of fluid from the portion of the main cylinder above the main piston.

In testimony whereof, I have hereunto set my hand and seal this 24th day of August, 1914.

LOUIS H. BRINKMAN.

Witnesses:

SAMUEL M. WARD, Jr.,
JOHN O. GEMPLER.